United States Patent
Muratov (10) Patent No.: US 9,001,529 B2
(45) Date of Patent: Apr. 7, 2015

(54) SYSTEM AND METHOD FOR POWER TRANSFER CONTROL BASED ON AVAILABLE INPUT POWER

(75) Inventor: Vladimir Alexander Muratov, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 292 days.

(21) Appl. No.: 13/464,672

(22) Filed: May 4, 2012

(65) Prior Publication Data
US 2013/0182461 A1 Jul. 18, 2013

Related U.S. Application Data

(60) Provisional application No. 61/587,560, filed on Jan. 17, 2012, provisional application No. 61/588,065, filed on Jan. 18, 2012.

(51) Int. Cl.
*H02M 3/335* (2006.01)
*H02J 17/00* (2006.01)
*H02M 3/24* (2006.01)
*H02J 7/02* (2006.01)
*H02J 7/00* (2006.01)

(52) U.S. Cl.
CPC *H02M 3/24* (2013.01); *H02J 7/025* (2013.01); *H02J 17/00* (2013.01); *H02J 2007/0096* (2013.01)

(58) Field of Classification Search
USPC .................................. 323/299; 363/15, 80, 89
See application file for complete search history.

(56) References Cited

U.S. PATENT DOCUMENTS

| 7,884,586 | B2* | 2/2011 | Fabbro .......................... 323/259 |
| 7,969,135 | B2* | 6/2011 | Luzzi et al. .................... 323/299 |
| 7,988,446 | B2* | 8/2011 | Yeh et al. ....................... 425/572 |
| 8,467,197 | B2* | 6/2013 | Perisic et al. ................... 363/17 |
| 2004/0047166 | A1 | 3/2004 | Lopez-Santillana et al. |
| 2008/0175025 | A1* | 7/2008 | Yoon ............................... 363/15 |
| 2011/0080152 | A1* | 4/2011 | Luzzi et al. .................... 323/299 |
| 2011/0157927 | A1* | 6/2011 | Adragna et al. ................ 363/26 |

FOREIGN PATENT DOCUMENTS

| EP | 2383857 | 11/2011 |
| JP | 05211731 | 8/1993 |
| JP | 09322402 | 12/1997 |
| JP | 2008245457 | 10/2008 |

OTHER PUBLICATIONS

PCT Search Report mailed May 9, 2013.

* cited by examiner

*Primary Examiner* — Jue Zhang
*Assistant Examiner* — Lakaisha Jackson
(74) *Attorney, Agent, or Firm* — William B. Kempler; Frank D. Cimino (57) ABSTRACT

The present invention employs system and method in for distinguishing between power capabilities of various external power sources and a system that can communicate the identified power capabilities to the secondary side of the wireless power transfer system. Once the secondary side of the wireless power transfer system receives the power capability information, it adjusts the current available for a payload in accordance with the information received on power source capabilities.

16 Claims, 7 Drawing Sheets

SYSTEM AND METHOD FOR POWER TRANSFER CONTROL BASED ON AVAILABLE INPUT POWER

The present application claims priority from U.S. Provisional Application No. 61/587,560 filed Jan. 17, 2012, and U.S. Provisional Application No. 61/588,065 filed Jan. 18, 2012, the entire disclosures of which are incorporated herein by reference.

BACKGROUND

Wireless energy transfer is the transmission of electrical energy from a power source to an electrical load without the use of interconnecting conductors. Wireless transmission can be useful when one has many electrical loads to charge, where the use of interconnecting wires may be inconvenient.

Wireless charging pads make use of electrodynamic induction, and are a common method of successfully transferring energy without the use of wires. When an electrical device that needs to be charged, such as a cell phone, needs to be charged, it is set on top of the pad and energy transferred from the pad will charge the cell phone battery. Wireless energy transfer is limited by the ability of the cell phone battery being capable of receiving and using the transmitted power.

Some wireless power transfer systems may be required to operate from a variety of input power sources. For example, the mobile phone wireless charging pad can be normally powered from the wall adapter with the adequate power rating. At the same time, it is highly desirable that the same part operates when powered from a USB port or power sources that harvest electrical energy from renewable energy sources.

A USB port normally provides substantially lower power output (2.5 W) than a wall adapter (6.5 W), while both have the same output voltage level. In current wireless power transfer systems, this can present a problem as the wireless charging pad has no means to communicate to the remote part of the wireless power transfer system.

The remote part of the wireless power transfer system will attempt to draw a nominal load current despite the limited input. This will effectively render the wireless power transfer system inoperable.

What is needed is a system and method for distinguishing between power capabilities of input sources and a means of communicating the identified power capability to the secondary side of the wireless power transfer system.

BRIEF SUMMARY

The present invention provides a system and method for identifying power source capabilities and then sending that information to the remote side of the wireless power transfer system, so that the remote side can make adjustments as needed.

The present invention provides a method of identifying the capabilities and availability of various energy sources. Once the capabilities of a power source are identified, the information is sent to the remote end of the wireless power transfer system. With this information the system is able to adjust its power output, which will avoid the collapse of the power transfer process.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

The present invention employs system and method in for distinguishing between power capabilities of various external power sources and a system that can communicate the identified power capabilities to the secondary side of the wireless power transfer system. Once the secondary side of the wireless power transfer system receives the power capability information, it adjusts the current available for a payload in accordance with the information received on power source capabilities.

In one embodiment, in accordance with aspects of the present invention, a signal generator will send an information signal that energizes the second side of the wireless power transfer system for the first time during a wireless power transfer session. In order to communicate the capabilities of the power source, a pulse is incorporated into the information signal.

The pulse duration or the lack thereof is used to communicate the capabilities of the power source to the secondary side of the wireless power transfer system. For example, a signal with no pulse associated with it will communicate to the secondary side that there is no lack of power and that it may draw a nominal load. In some embodiments, the duration of the pulse is proportional to the available amount of power. For example, if the pulse duration is 50 μs, it will indicate to the secondary side that the amount of available power is 25% less than the nominal amount. A pulse duration of 150 μs will indicate to the secondary side of the wireless power transfer system that the available power is 75% less than the nominal amount.

Note that in this example the length of the pulse is proportional to the available power, but in practice it may be proportional or inversely proportional. Additionally, in some embodiments a pulse may be associated with a low power source and no pause is associated with full power available. In other embodiments a pulse may be associated with a high power source and no pulse is associated with lower power available.

Once the amount of power available has been communicated with the secondary side of the wireless power transfer system, it may adjust its output accordingly. The ability to adjust the power output can prevent the collapse of the wireless transfer process and allow the system to remain operable.

Example systems in accordance with aspects of the present invention will now be described with reference to FIGS. 1-8.

Figure 1:
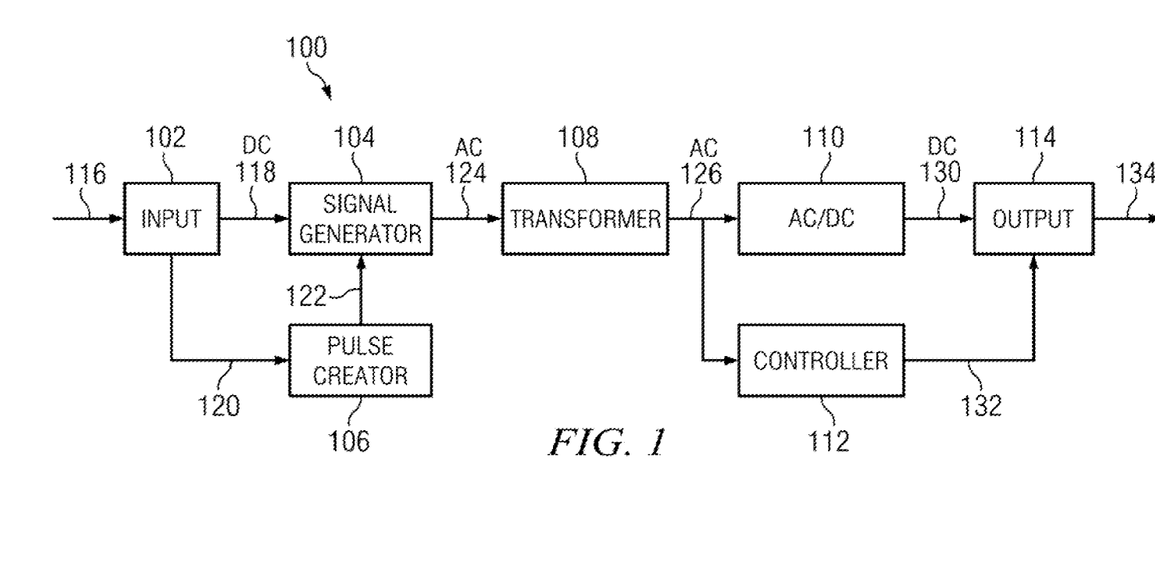
FIG. 1 illustrates a block diagram of an example power transfer system, in accordance with aspects of the present invention

FIG. 1 illustrates an example power transfer system 100 in accordance with aspects of the present invention.

As illustrated in the figure, power transfer system 100 includes an input 102, a signal generator 104, a pulse creator 106, a transformer 108, an AC/DC converter 110, a controller 112, and an output 114.

An input portion is able to receive AC power from power connection 116. Further, an input determining portion can determine a parameter of the DC input signal. In an example embodiment, the input determining portion is operable to determine the amplitude of the voltage of the AC input. For purposes of discussion the input portion and input determining portion will be referred to as input 102 and the parameter of the input will be referred to as power information signal 120.

Input 102 is arranged to receive power from power supply connection 116. Input 102 is additionally arranged to send power 118 to signal generator 104 and to send power information signal 120 to pulse creator 106.

A primary signal generator can generate a primary signal. In an example embodiment, the information signal generator is operable to generate a primary signal based on the parameter determined by the input determining portion of input 102 and the information signal from pulse creator 106. For purposes of discussion the primary signal generator will be referred to as signal generator 104 and the primary signal is AC power and interruption signal 124.

Signal generator 104 is arranged to receive power 118 from input 102. Signal generator 104 is additionally arranged to send AC power and pulse 122 to transformer 108 via AC power and interruption signal 124.

An information signal generator can generate an information signal that is based on the parameter of the input determining portion. In an example embodiment, the information signal generator is a pulse creator and the information signal is a pulse, wherein its width is based on the parameter. In a further specific embodiment, the pulse width is based on the voltage amplitude of the input signal. For purposes of discussion the information signal generator will be referred to as pulse creator 106 and the information signal will be referred to as pulse 122.

Pulse creator 106 creates a pulse, whose width will be proportional to the amount of power available, which will be indicated by power information signal 120. Pulse creator 106 can additionally send pulse 122 to signal generator 104.

There is a transformer having a primary side and a secondary side. In an example embodiment, the primary side is operable to induce a secondary signal in the secondary side which is based on the primary signal sent by the information signal generator. For purposes of discussion the transformer will be referred to as transformer 108, the primary signal will be referred to as AC power and interruption signal 124, and the secondary signal will be referred to as power and transient signal 126.

Transformer 108 is arranged to transfer AC power and interruption signal 124 from the first part of the wireless power transfer system to the second side of the wireless power transfer system.

An AC/DC converting portion can receive an AC input and output a corresponding DC signal. In an example embodiment, the DC signal that is output is based on the secondary signal output by transformer 108. For purposes of discussion, the AC/DC converting portion will be referred to as AC/DC convertor 110.

AC/DC converter 110 is operable to convert AC power it receives from transformer 108 into DC power which is sent to output 114 via power 130.

A controlling portion can generate a control signal. In an example embodiment, the control signal sent out by the controlling portion is based on the secondary signal created by the transformer. For purposes of discussion the controlling portion will be referred to as controller 112 and the control signal is will be referred to as signal 132.

Controller 112 is arranged to receive power and transient signal 126 from transformer 108. Controller 112 is operable to send output information, based on power and transient signal 126, to output 114 via signal 132.

An output portion can output a signal. In an example embodiment, the output portion is operable to output an output signal based on the DC signal output by the AC/DC converting portion. For purposes of discussion, the output portion will be referred to as output 114 and the power being output will be referred to as power output 134.

Output 114 is arranged to output power via power output 134 based on information received from controller 112.

Operation of power transfer system 100 will now be described in greater detail with additional reference to FIGS. 2-5.

In a simple situation, power transfer system 100 outputs a preset power based on a preset input. This situation will be described with additional reference to FIG. 2.

Figure 2:
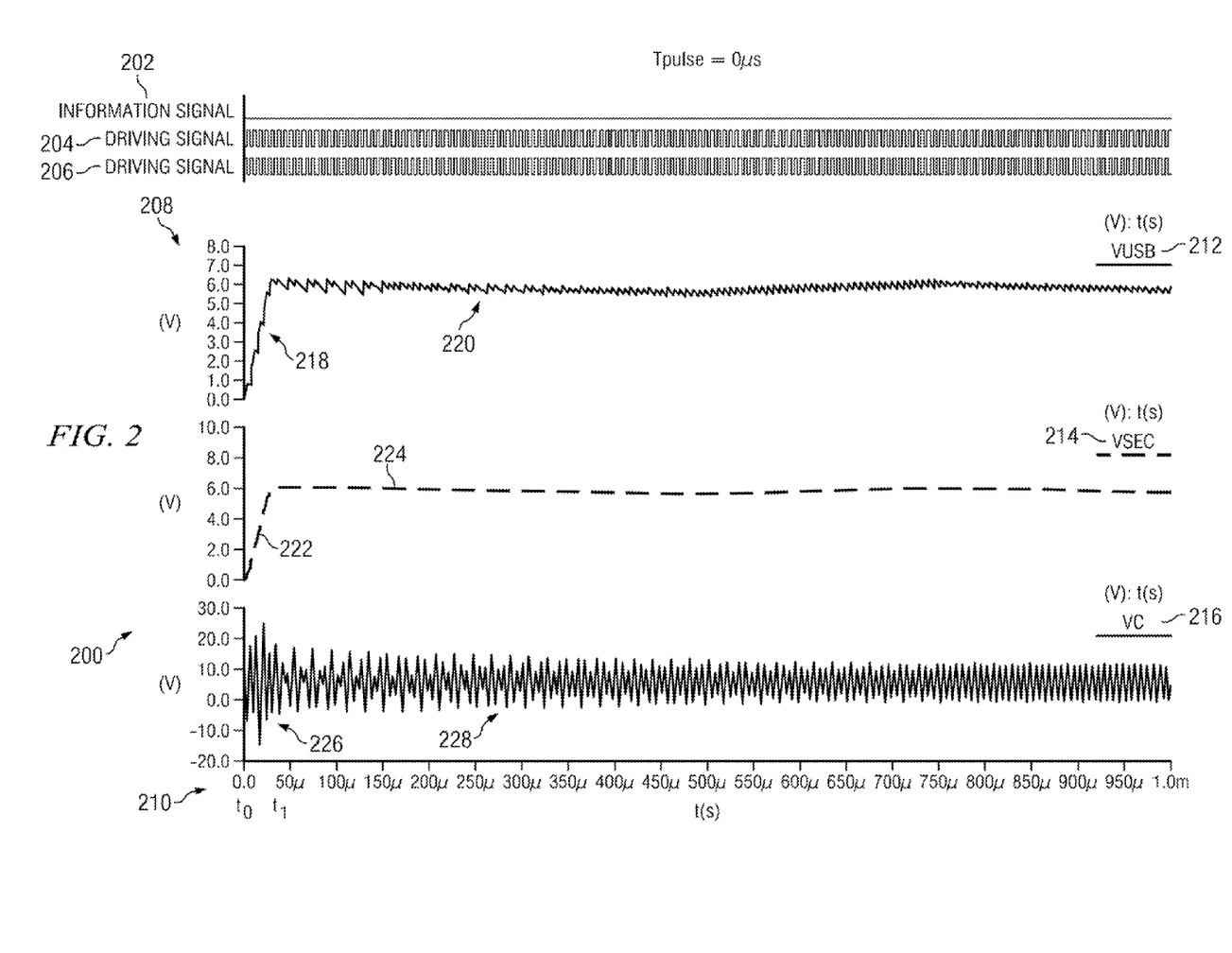
FIG. 2 is a graph of an example system 200 that is able to draw a nominal amount of power, in accordance with aspects of the present invention.

FIG. 2 illustrates a plurality of waveforms corresponding to the operation of power transfer system 100 with a wireless power transfer system that is able to draw nominal power from an external power source.

As illustrated in FIG. 2, graph 200 includes an information signal 202, a driving signal 204, a driving signal 208, a y-axis 208, an x-axis 210, a VUSB 212, a VSEC 214, and a VC 216. VUSB 212 includes a segment 218 and a segment 220. VSEC 214 includes a segment 222 and a segment 224. VC 216 includes a segment 226 and a segment 228.

Information signal 202 represents the signal that is produced that contains power availability information about an external power source. Information signal 202 corresponds to AC power and interruption signal 124 of power transfer system 100 of FIG. 1. Driving signal 204 and driving signal 206 each represent signals which power drivers in the wireless power transfer system. Driving signal 204 and driving signal 206 both correspond to power and transient signal 126 of power transfer system of FIG. 1.

Y-axis 208 is voltage measured in Volts, whereas x-axis 210 is time in milliseconds. Both y-axis 208 and x-axis 210 are used to measure VUSB 212, VSEC 214, and VC 216.

VUSB 212 represents the voltage as a function of time in the first part of the wireless power transfer system. VSEC 214 represents the voltage as a function of time in the second part of the wireless power transfer system. VC 216 represents the voltage as a function of time in the receiving coil contained within the transformer of the wireless power transfer system.

VUSB 212 corresponds to the voltage being output of AC/DC convertor 110, VSEC 214 corresponds to the voltage being output by output 114, and VC 216 corresponds to the voltage inside of transformer 108.

In this example, and only for purposes of discussion, the external power source (not shown) is able to provide a nominal 6.5 W of power at 120V, which provides a current of 54 mA. The external power source providing power to the wireless power transfer system corresponds to power supply connection 116 of power transfer system 100 illustrated in FIG. 1.

In operation, a first part of system 100, which includes input 102, signal generator 104 and pulse creator 106, is designed to receive power from a variety of external AC/DC power sources and detect information about power availability. A second part of system 100, which includes AC/DC converter 110, controller 112 and output 114, is designed to adjust power output according to power availability detected in the first part of system 100 and output it to a wireless charging pad.

Input 102 is connected to an external power source (not shown) via power supply connection 116. If the external power source is DC, such as a battery, the energy is being transferred in a form that is compatible with the circuitry and no conversion is necessary for power to be sent to the signal generator.

If input 102 is connected to an AC power source such as an electrical socket, the energy being transferred must be converted by input 102 so that the energy sent to signal generator 104 is in DC form.

At time $t_0$, the wireless power transfer system starts. Information signal 202 is sent out which provides an initial amount of energy to power up the second side of the wireless power transfer system. Driving signal 204 and driving signal 206 are sent out to begin driving drivers in the system. This corresponds to transformer 108 transferring an initial amount of energy from the first part of the system via AC power and interruption signal 124 to the second part of the system via power and transient signal 126.

Between time $t_0$ and time $t_1$, VUSB 212, VSEC 214, and VC 216 are in a transient state as shown by segment 218, segment 222, and segment 224, respectively. This sharp increase to 6V (operating voltage) represents elements of the second part of the wireless power transfer system powering up. Segment 218, segment 222, and segment 226 correspond to AC power and interruption signal 124 of the first part of the wireless power transfer system being sent to transformer 108, and transformer 108 then transferring power via power and transient signal 126 to second part of the wireless power transfer system.

VUSB 212, VSEC 214, and VC 216 are in a steady state after time $t_1$ as shown by segment 220, segment 224, and segment 228. VUSB 212, VSEC 214, and VC 216 remain in a steady state for the duration of the wireless power transfer system operation. Segment 220, segment 224, and segment 228 correspond to the wireless power transfer system reaching a steady state as power is constantly being sent to signal generator 104 and then sent to transformer 108.

Simultaneously, as power is being sent to signal generator 104, input 102 sends power information signal 120 to pulse creator 106. Power information signal 120 informs pulse creator 106 of the amount of available power and the voltage and current at which it can be drawn from the external power source.

Pulse creator 106 is able to associate aspects of various external power sources to distinct pulse widths. Any known type of such pulse creator may be used as pulse creator 106, non-limiting examples of which include a programmable logic array or a device having a look-up table. Non-limiting examples of aspects of a power source includes supplied voltage, supplied current, and supplied power. For purposes of discussion, in a non-limiting example, pulse creator 106 contains a look-up table for various external power sources that are able to supply power to the wireless power transfer system. Based on power information signal 120, pulse creator 106 will check the look-up table for a pulse length that is associated with the power, voltage, and/or current of the external power source.

Based on the information received from power information signal 120, pulse creator 106 will create a pulse, the duration of which is associated with the external power source that the wireless power transfer system is connected to.

In this example embodiment, the nominal power input can be drawn from the external power source, and the database informs pulse creator 106 that it should not send a pulse. Since there is no pulse associated with the external power source in this example, pulse creator sends pulse 122 without a pulse to signal generator 104 which corresponds to information signal 202.

If pulse creator 106 had found that there was a pulse associated with the external power source, it would have sent the pulse to signal generator 104 via pulse 122. In particular, pulse 122 is used to interrupt power 118, such that AC power and interruption signal 124 is power 118 with the addition of an interruption having a period equal to that of pulse 122.

The interruption in AC power and interruption signal 124 causes transformer 108 to output a transient signal for a period of time. Further, the interruption in the signal from signal generator 104 will end, after a period associated with pulse 122 as discussed above. The ending of the interruption, or in other words the restarting of the signal, causes transformer 108 to output another transient signal for a period of time. The transient signature created by both the beginning of the interruption and the end of the interruption, will be uniquely associated with pulse 122 and will be identifiable by controller 112.

Once signal generator 104 has received power 118 and pulse 122, it will send it to transformer 108 via AC power and interruption signal 124. Transformer 108 transfers power and pulse 122 from the first side to the second side of the wireless power transfer system.

As known to those of skill in the art, transformer 108 may increase the voltage while decreasing the current or it may decrease the voltage while increasing the current. For purposes of discussion, presume in this embodiment that transformer 108 decreases the voltage while increasing the current. Transformer 108 then outputs a transformed AC power and interruption signal 124 to AC/DC converter 110 and to controller 112 via power and transient signal 126.

In this example embodiment, the wireless power transfer system is connected to a wall socket. For purposes of discussion, presume in this embodiment that electrical load requires a constant 6V input. In electrical circuits power is equal to the voltage multiplied by the current. In this example the external power source is able to provide a nominal 6.5 W of power at 120V. To find the current, one must divide power by voltage. Dividing 6.5 W by 120V gives a current of 54 mA.

Because the electrical load requires a constant 6V input, transformer 108 must step down voltage and increase current while keeping the power being input and the power being output equal to each other. After passing through transformer 108, there is still 6.5 W of power, but it is being delivered at 6V. Dividing 6.5 W of power by 6V gives a current of 1.08 A, which in this example is the nominal voltage and current required by the load.

AC/DC convertor 110 converts power and transient signal 126 that it receives from transformer 108 into DC power. Once the power has been converted into DC, it is sent to output 114.

Simultaneously, controller 112 receives power and transient signal 126 which contains information about the external power source that the wireless power transfer system is connected to. Controller 112 contains a look-up table of transient signatures, the external power source that is associated with each signature, and instructions for output 114. Once controller 112 has identified the transient signature, it can locate that particular signature in its look-up table to find the power, voltage, and current of the external power source.

Once the external power source has been identified, controller 112 can find the instructions associated with the external power source that can then be sent to output 114. The instructions that are sent to output 114 contain information about how to adjust the current of output 114 as well as how long it will take the second part of the wireless power transfer system to return to a steady state.

Controller 112 identifies that there is no transient signature associated with the external power source. The lack of a transient signature corresponds to segment 220, segment 224, and segment 228. Controller 112 cross references the lack of a transient signature with its database and finds that it should send instructions to output 114. The instructions sent to output 114 inform it that it should not make any current or voltage adjustments and to output power once the system is in a steady state.

power transfer system in accordance with aspects of the present invention is able to adjust its output based on the input power source. In particular, the primary side is able to provide information to the secondary side, such that the secondary side can make necessary adjustments in order to protect the load. This will now be described in greater detail with reference to FIGS. 3-5.

Figure 3:
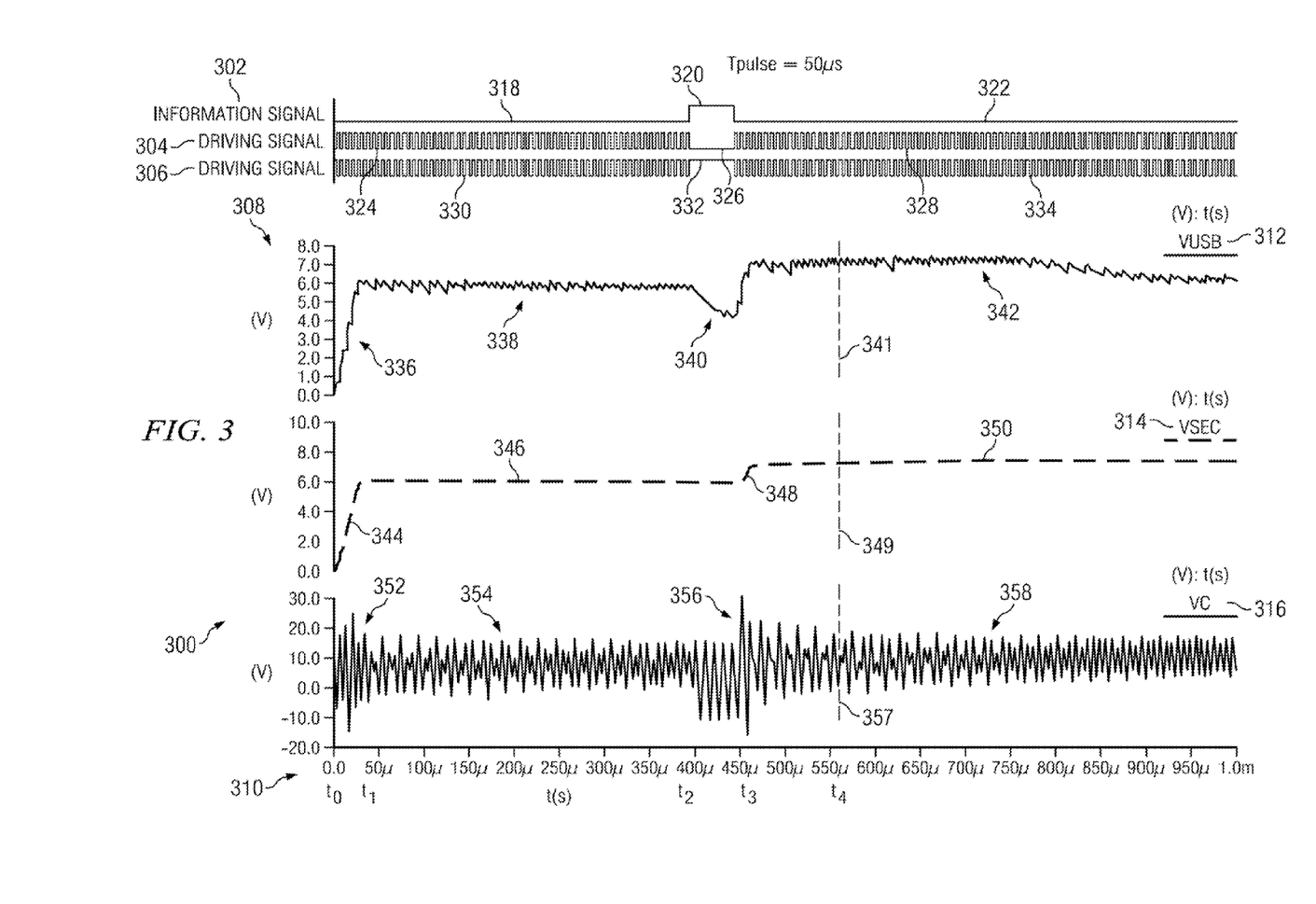
FIG. 3 is a graph of an example system 300 that is only able to draw 75% of the nominal amount of power, in accordance with aspects of the present invention.

FIG. 3 illustrates a plurality of waveforms corresponding to the operation of power transfer system 100 with a wireless power transfer system that is only able to provide 75% of the nominal power required.

As illustrated in FIG. 3, graph 300 includes an information signal 302, a driving signal 304, a driving signal 306, a y-axis 308, an x-axis 310, a VUSB 312, a VSEC 314, and a VC 316. VUSB 312 includes a segment 336, a segment 338, a segment 340 and a segment 342. VSEC 314 includes a segment 344, a segment 346, a segment 348 and a segment 350. VC 316 includes a segment 352, a segment 354, a segment 356 and a segment 358.

Information signal 302 represents the signal that is produced that contains power availability information about an external power source. Information signal 302 corresponds to AC power and interruption signal 124 of power transfer system 100 of FIG. 1. Driving signal 304 and driving signal 306 each represent signals which power drivers in the wireless power transferring system. Driving signal 304 and driving signal 306 both correspond to power and transient signal 126 of power transfer system 100 of FIG. 1.

Y-axis 308 is voltage measured in Volts, whereas x-axis 310 is time in milliseconds. Both y-axis 308 and x-axis 310 are used to measure VUSB 312, VSEC 314, and VC 316.

VUSB 312 represents the voltage as a function of time in the first circuit of the wireless power transfer system. VSEC 314 represents the voltage as a function of time in the second circuit of the wireless power transfer system. VC 316 represents the voltage as a function of time in the receiving coil contained within the transformer of the wireless power transfer system.

VUSB 312 corresponds to the voltage being output by AC/DC portion 110, VSEC 314 corresponds to the voltage being output by output 114, and VC 316 corresponds to the voltage inside of transformer 108.

In this example. and only for purposes of discussion, the external power source (not shown) is able to provide a 75% of the nominal power which is 4.875 W at 120V, which provides a current of 40 mA. The external power source providing power to the wireless power transfer system corresponds to power supply connection 116 of power transfer system 100 illustrated in FIG. 1.

In operation, a first part of system 100, which includes input 102, signal generator 104 and pulse creator 106, is designed to receive power from a variety of external AC/DC power sources and detect information about power availability. A second part of system 100, which includes AC/DC converter 110, controller 112 and output 114, is designed to adjust power output according to power availability detected in the first part of system 100 and output it to a wireless charging pad.

Input 102 is connected to an external power source (not shown). If the external power source is DC the energy is in a usable form. If the external power source is AC, input 102 will convert the energy into a DC form and then send it to signal generator 104 via power 118.

At time $t_0$, the wireless power transfer system starts. Information signal 302 is sent out which provides an initial amount of energy to power up the second side of the wireless power transfer system. Driving signal 304 and driving signal 306 are sent out to begin driving drivers in the system. This corresponds to transformer 108 transferring an initial amount of energy from the first part of the system via AC power and interruption signal 124 to the second part of the system via power and transient signal 126.

Between time $t_0$ and time $t_1$, VUSB 312, VSEC 314, and VC 316 are in a transient state as shown by segment 336, segment 344, and segment 352. This sharp increase to 6V (operating voltage) represents elements of the second part of the wireless power transfer system powering up. Segment 336, segment 344, and segment 352 correspond to AC power and interruption signal 124 of the first part of the wireless power transfer system being sent to transformer 108, and transformer 108 then transferring power via power and transient signal 126 to second part of the wireless power transfer system.

VUSB 312, VSEC 314, and VC 316 are in a steady state after time $t_1$ as shown by segment 338, segment 346, and segment 354. VUSB 312, VSEC 314, and VC 316 remain in a steady state until time $t_2$. Segment 338, segment 346, and segment 354 correspond to the wireless power transfer system reaching a steady state as power is constantly being sent to signal generator 104.

Simultaneously, as power is being sent to signal generator 104, input 102 sends power information signal 120 to pulse creator 106. Power information signal 120 informs pulse creator 106 of the amount of available power and the voltage and current at which it can be drawn from the external power source.

Based on power information signal 120, pulse creator 106 will check its look-up table for a pulse length that is associated with the power, voltage, and current of the external power source that it is connected to.

In this example embodiment, pulse creator 106 finds that there is a 50 μs pulse associated with the external power supply that should be sent out. Once signal generator 104 has received DC power and pulse 122, it sends both to transformer 108 via AC power and interruption signal 124. In particular, pulse 122 is used to interrupt power 118, such that AC power and interruption signal 124 is power 118 with the addition of an interruption having a period equal to that of pulse 122.

At time $t_2$, power 118 with the addition of an interruption having a period equal to that of pulse 122 is sent from signal generator 104 to transformer 108 may transform them. For purposes of discussion, presume in this embodiment that transformer 108 decreases the voltage while increasing the current. Transformer 108 then outputs a transformed AC power and interruption signal 124 to AC/DC convertor 110 and to controller 112.

For purposes of discussion, presume in this embodiment that electrical load requires a constant 6V input. In electrical circuits power is equal to the voltage multiplied by the current. In this example the external power source is able to provide a nominal 4.875 W of power at 120V. To find the current, one must divide power by voltage. Dividing 6.5 W by 120V gives a current of 40 mA.

Because the electrical load requires a constant 6V input, transformer 108 must step down voltage and increase current while keeping the power being input and the power being output equal to each other. After passing through transformer 108, there is still 6.5 W of power, but it is being delivered at 6V. Dividing 4.875 W of power by 6V gives a current of 812 mA, which in this example is less the nominal current required by the load.

As mentioned above, the signal from generator 104 includes an interruption. The interruption in the signal causes transformer 108 to output a transient signal for a period of time. Further, the interruption in the signal from generator 104 will end, after a period associated with pulse 122 as discussed above. The ending of the interruption, or in other words the restarting of the signal, causes transformer 108 to output another transient signal for a period of time. The transient signature created by both the beginning of the interruption and the end of the interruption, will be uniquely associated with pulse 122 and will be identifiable by controller 112.

When transformer 108 is interrupted and outputs a transient signal, corresponds to segment 340 of VUSB 312, segment 348 of VSEC 314, and segment 356 of VC 316. At time $t_3$ the interruption has passed the wireless power transfer system returns to a steady state at time $t_4$. The wireless power transfer system reaching a steady state after the interruption corresponds to segment 342, segment 350, and segment 358.

Controller 112 receives power and transient signal 126, which contains the transient signature from transformer 108. Controller 112 contains a look-up table of transient signatures, the external power that is associated with each signature, and the instructions for output 114. Once controller 112 has identified the transient signature, it can locate that particular signature in its look-up table to find the power, voltage, and current of the external power source.

Once the external power source has been identified, controller 112 can find the instructions associated with the external power source that can then be sent to output 114. The instructions that are sent to output 114 contain information about how to adjust the current of output 114 as well as how long it will take the second part of the wireless power transfer system to return to a steady state.

Simultaneously, AC/DC convertor 110 converts the AC signal that it receives from transformer 108 into DC power. Once the power has been converted into DC, it is sent to output 114.

Since the nominal power rating for the wireless power transfer system is 6.5 W of power at 6V and 1.08 A, controller 112 must send instructions to the output to inform it that it needs to lower the current. Lowering the output current from a nominal value of 1.08 A to 812 mA allows the wireless power transfer system to operate despite having an insufficient external power source.

Once the output has lowered the current, it waits until a time $t_4$ to begin outputting electricity to the electrical load. Waiting until the wireless power transfer system has returned to a steady state prevents damage of the electrical load due to power spikes in the system.

Figure 4:
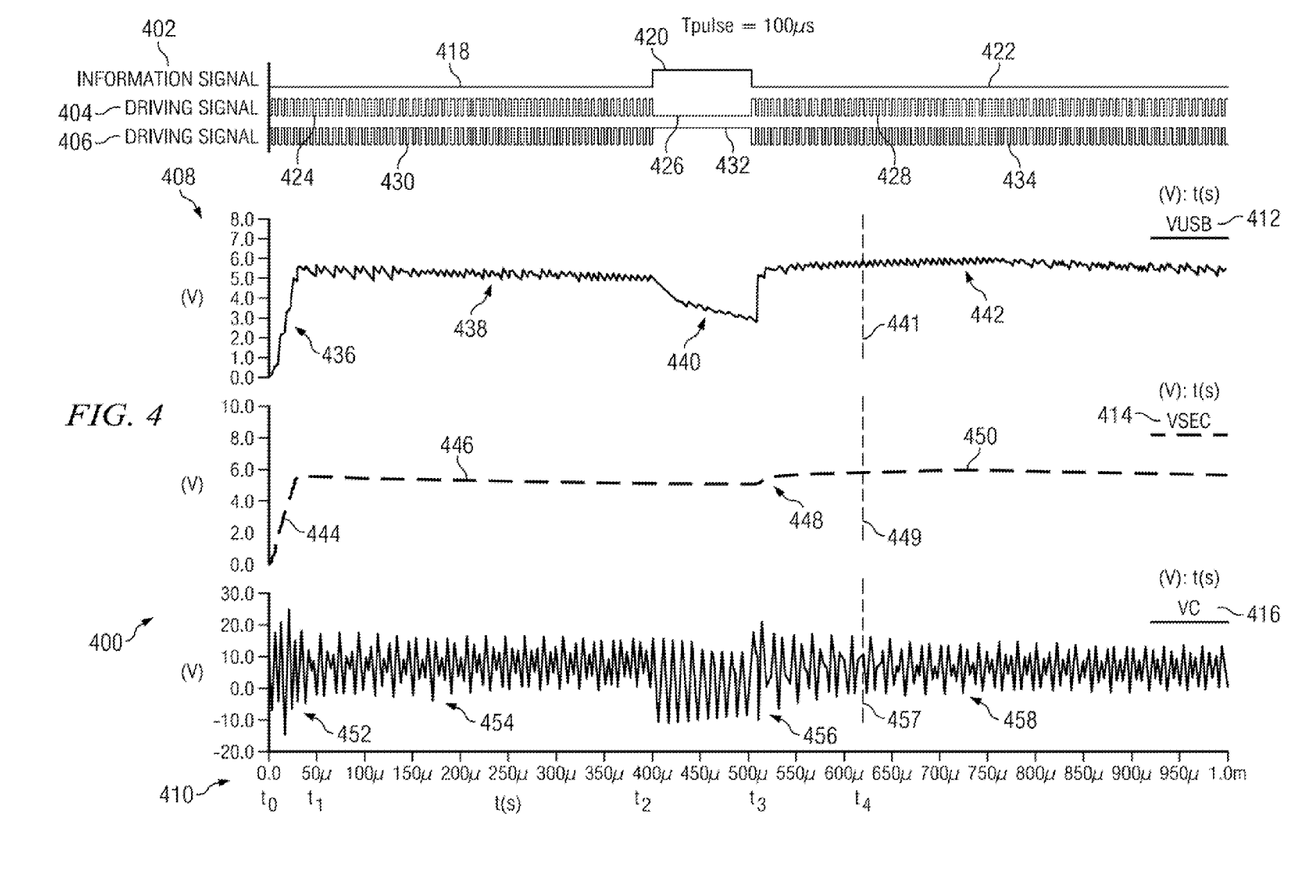
FIG. 4 is a graph of an example system 400 that is only able to draw 50% of the nominal amount of power, in accordance with aspects of the present invention.

FIG. 4 illustrates a plurality of waveforms corresponding to the operation of power transfer system 100 with a wireless power transfer system that is only able to provide 50% of the nominal power required.

As illustrated in FIG. 4 graph 400 includes an information signal 402, a driving signal 404, a driving signal 406, a y-axis 408, an x-axis 410, a VUSB 412, a VSEC 414, and a VC 416. VUSB 412 includes a segment 436, a segment 438, a segment 440 and a segment 442. VSEC 414 includes a segment 444, a segment 446, a segment 448 and a segment 450. VC 416 includes a segment 452, a segment 454, a segment 456 and a segment 458.

Information signal 402 represents the signal that is produced that contains power availability information about an external power source. Information signal 402 corresponds to AC power and interruption signal 124 of power transfer system 100 of FIG. 1. Driving signal 404 and driving signal 406 each represent signals which power drivers in the wireless power transferring system. Driving signal 404 and driving signal 406 both correspond to signal 120 of power transfer system 100 of FIG. 1.

Y-axis 408 is voltage measured in Volts, whereas x-axis 410 is time in milliseconds. Both y-axis 408 and x-axis 410 are used to measure VUSB 412, VSEC 414, and VC 416.

VUSB 412 represents the voltage as a function of time in the first circuit of the wireless power transfer system. VSEC 414 represents the voltage as a function of time in the second circuit of the wireless power transfer system. VC 416 represents the voltage as a function of time in the receiving coil contained within the transformer of the wireless power transfer system.

VUSB 412 corresponds to the voltage being output by AC/DC portion 110, VSEC 414 corresponds to the voltage being output by output 114, and VC 416 corresponds to the voltage inside of transformer 108.

In this example, and only for purposes of discussion, the external power source (not shown) is able to provide a 50% of the nominal power which is 3.25 W at 120V, which provides a current of 27 mA. The external power source providing power to the wireless power transfer system corresponds to power supply connection 116 of power transfer system 100 illustrated in FIG. 1.

In operation, the startup of system 100 in this example the same as the startup of system 100 as described in FIG. 3. At time $t_0$ the wireless power transfer system starts. Input 102 is connected to an external power source and an initial amount of energy is supplied to power up the second side of the wireless power transfer system.

The system is powering up between time $t_0$ and time $t_1$ as shown by segment 436 of VUSB 412, segment 444 of VSEC 414, and segment 452 of VC 416. The system is in a steady state after time $t_1$ as shown by segment 438, segment 446, and segment 454, due to signal generator 104 receiving power from input 102 and sending it to transformer 108.

Simultaneously, as power is being sent to signal generator 104 input 102 sends power information signal 120 to pulse creator 106. Pulse creator 106 will then check its look-up table for a pulse length that is associated with the power, voltage, and current of the external power source.

Pulse creator 106 finds that there is a 100 μs pulse associated with the external power supply that should be sent out. Pulse creator 106 sends the 100 μs pulse to signal generator 104, which corresponds to segment 420 of information signal 402. Once signal generator 104 has received DC power from input 102 and pulse 122 from pulse creator 106, it sends AC power and interruption signal 124 to transformer 108. Amplitude of the pulse 420 can be used to indicate a power level, such as shown by pulse 421.

Transformer 108 outputs power and transient signal 126 to the second side of the wireless power transfer system. For purposes of discussion, in this example embodiment the electrical load requires a constant 6V input. Because the electrical load requires a constant 6V input, transformer 108 must step down the voltage and increase current while keeping the power input and output equal to each other. The transformer steps down the voltage from 120V to 6V, increases the current from 27 mA to 541 mA, while keeping the power being input and output at 3.25 W.

Transformer 108 receives pulse 122 at time $t_2$ and is interrupted. Because of the interruption, transformer 108 outputs a transient signal for 100 μs. The transient signal corresponds to segment 440, segment 448, and segment 456. At time $t_3$ the interruption has passed and the wireless power transfer system returns to a steady state at time $t_4$. The wireless power transfer system is in a steady state after time $t_4$, which corresponds to segment 442, segment 450, and segment 458.

AC/DC converter 110 converts the AC signal that it receives from transformer 108 into DC power. Once the power has been converted into DC, it is sent to output 114.

Simultaneously, controller 112 receives power and transient signal 126 which contains the transient signature from transformer 108. Controller 112 cross references the transient signature with its look-up table and finds the instructions associated with the signature. Controller 112 finds that it needs to send instructions to output 114 that it needs to lower its current output and to wait until time $t_4$ to begin outputting power.

Since the nominal power rating for the wireless power transfer system is 6.5 W of power at 6V and 1.08 A, the controller must send instructions to the output to inform it that it needs to lower the current. Lowering the output current from a nominal value of 1.08 A to 541 mA allows the wireless power transfer system to operate despite having an insufficient external power source.

Once the output has lowered the current, it waits until a time $t_4$ to begin outputting electricity to the electrical load. Waiting until the wireless power transfer system has returned to a steady state prevents damage of the electrical load due to power spikes in the system.

Figure 5:
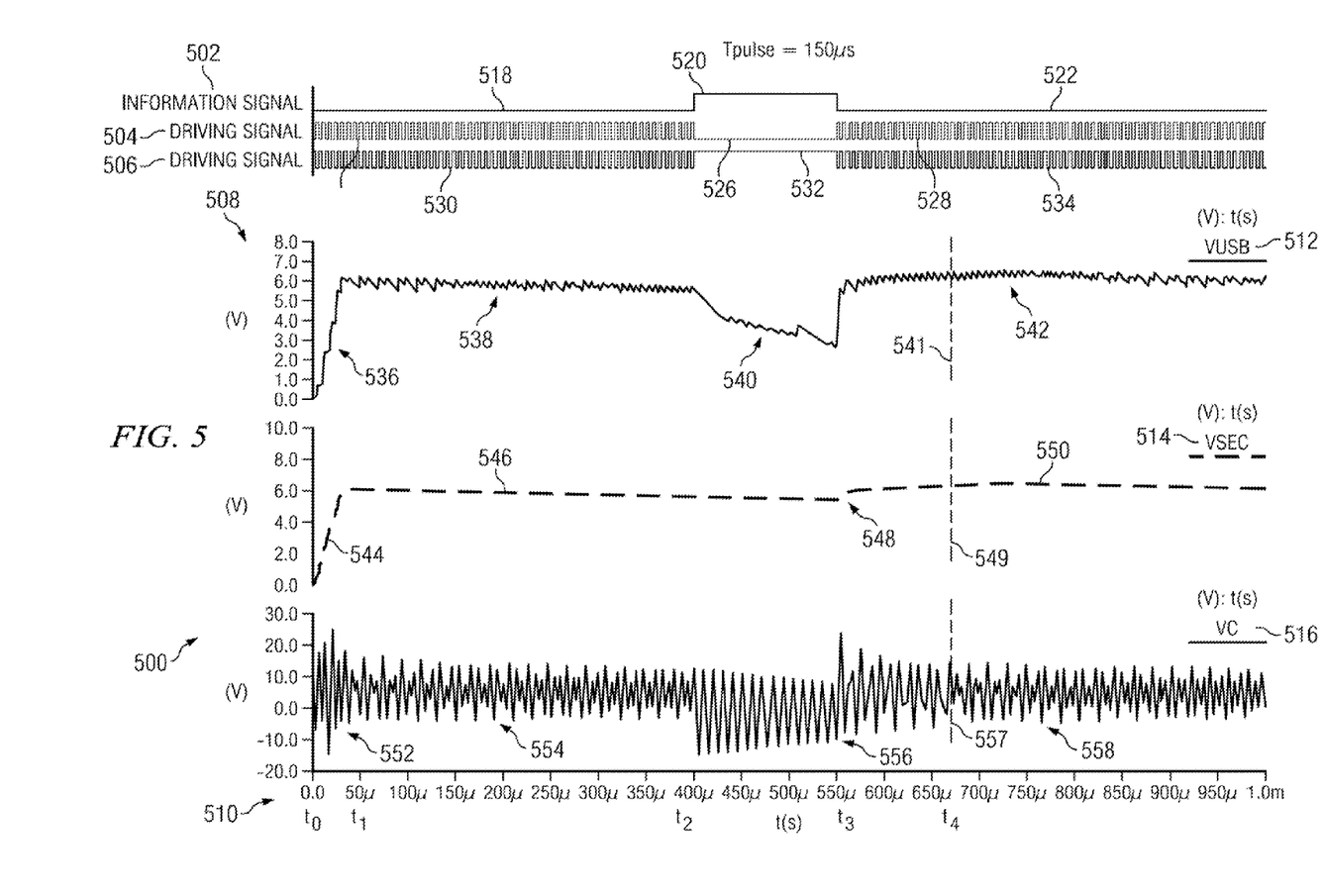
FIG. 5 is a graph of an example system 500 that is only able to draw 25% of the nominal amount of power, in accordance with aspects of the present invention.

FIG. 5 illustrates a plurality of waveforms corresponding to the operation of power transfer system 100 with a wireless power transfer system that is only able to provide 25% of the nominal power required.

As illustrated in FIG. 5 graph 500 includes an information signal 502, a driving signal 504, a driving signal 506, a y-axis 508, an x-axis 510, a VUSB 512, a VSEC 514, and a VC 516. VUSB 512 includes a segment 536, a segment 538, a segment 540 and a segment 542. VSEC 514 includes a segment 544, a segment 546, a segment 548 and a segment 550. VC 516 includes a segment 552, a segment 554, a segment 556 and a segment 558.

Information signal 502 represents the signal that is produced that contains power availability information about an external power source. Information signal 502 corresponds to power information signal 120 of FIG. 1. Driving signal 504 and driving signal 506 each represent signals which power drivers in the wireless power transferring system. Driving signal 504 and driving signal 506 both represent power and transient signal 126 of power transfer system 100 in FIG. 1.

Y-axis 508 is voltage measured in Volts, whereas x-axis 510 is time in milliseconds. Both y-axis 508 and x-axis 510 are used to measure VUSB 512, VSEC 514, and VC 516.

VUSB 512 represents the voltage as a function of time in the first circuit of the wireless power transfer system. VSEC 514 represents the voltage as a function of time in the second circuit of the wireless power transfer system. VC 516 represents the voltage as a function of time in the receiving coil contained within the transformer of the wireless power transfer system.

VUSB 512 corresponds to the voltage being output by AC/DC portion 110, VSEC 514 corresponds to the voltage being output by output 114, and VC 516 corresponds to the voltage inside of transformer 108.

In this example, and only for purposes of discussion, the external power source (not shown) is able to provide a 25% of the nominal power which is 1.625 W at 120V, which provides a current of 13 mA. The external power source providing power to the wireless power transfer system corresponds to power supply connection 116 of power transfer system 100 illustrated in FIG. 1.

In operation, the startup of system 100 in this example the same as the startup of system 100 as described in FIG. 3. At time $t_0$ the wireless power transfer system starts. Input 102 is connected to an external power source and an initial amount of energy is supplied to power up the second side of the wireless power transfer system.

The system is powering up between time $t_0$ and time $t_1$ as shown by segment 536 of VUSB 512, segment 544 of VSEC 514, and segment 552 of VC 516. The system is in a steady state after time $t_1$ as shown by segment 538, segment 546, and segment 554, due to signal generator 104 receiving power from input 102 and sending it to transformer 108.

Simultaneously as power is being sent to signal generator 104 input 102 sends power information signal 120 to pulse creator 106. Pulse creator 106 will check its look-up table for a pulse length that is associated with the power, voltage, and current of the external power source.

Pulse creator 106 finds that there is a 150 μs pulse associated with the external power supply that should be sent out. Pulse creator 106 sends the 150 μs pulse to signal generator 104, which corresponds to segment 520 of information signal 502. Once signal generator 104 has received DC power from input 102 and pulse 122 from pulse creator 106, it sends AC power and interruption signal 124 to transformer 108.

Transformer 108 outputs power and transient signal 126 to the second side of the wireless power transfer system. For purposes of discussion, in this example embodiment the electrical load requires a constant 6V input. Because the electrical load requires a constant 6V input, transformer 108 must step down the voltage and increase current while keeping the power input and output equal to each other. The transformer steps down the voltage from 120V to 6V, increases the current from 13 mA to 270 mA, while keeping the power being input and output at 1.625 W.

Transformer 108 receives pulse 122 at time $t_2$ and is interrupted. Because of the interruption, transformer 108 outputs a transient signal for 150 μs. The transient signal corresponds to segment 540, segment 548, and segment 556. At time $t_3$ the interruption has passed and the wireless power transfer system returns to a steady state at time $t_4$. The wireless power transfer system is in a steady state after time $t_4$, which corresponds to segment 542, segment 550, and segment 558.

AC/DC converter 110 converts the AC signal that it receives from transformer 108 into DC power. Once the power has been converted into DC, it is sent to output 114.

Simultaneously, controller 112 receives power and transient signal 126 which contains the transient signature from transformer 108. Controller 112 cross references the transient signature with its look-up table and finds the instructions associated with the signature. Controller 112 finds that it needs to send instructions to output 114 that it needs to lower its current output and to wait until time $t_4$ to begin outputting power.

Since the nominal power rating for the wireless power transfer system is 6.5 W of power at 6V and 1.08 A, the controller must send instructions to the output to inform it that it needs to lower the current. Lowering the output current from a nominal value of 1.08 A to 270 mA allows the wireless power transfer system to operate despite having an insufficient external power source.

Once the output has lowered the current, it waits until a time $t_4$ to begin outputting electricity to the electrical load. Waiting until the wireless power transfer system has returned to a steady state prevents damage of the electrical load due to power spikes in the system.

Figure 6:
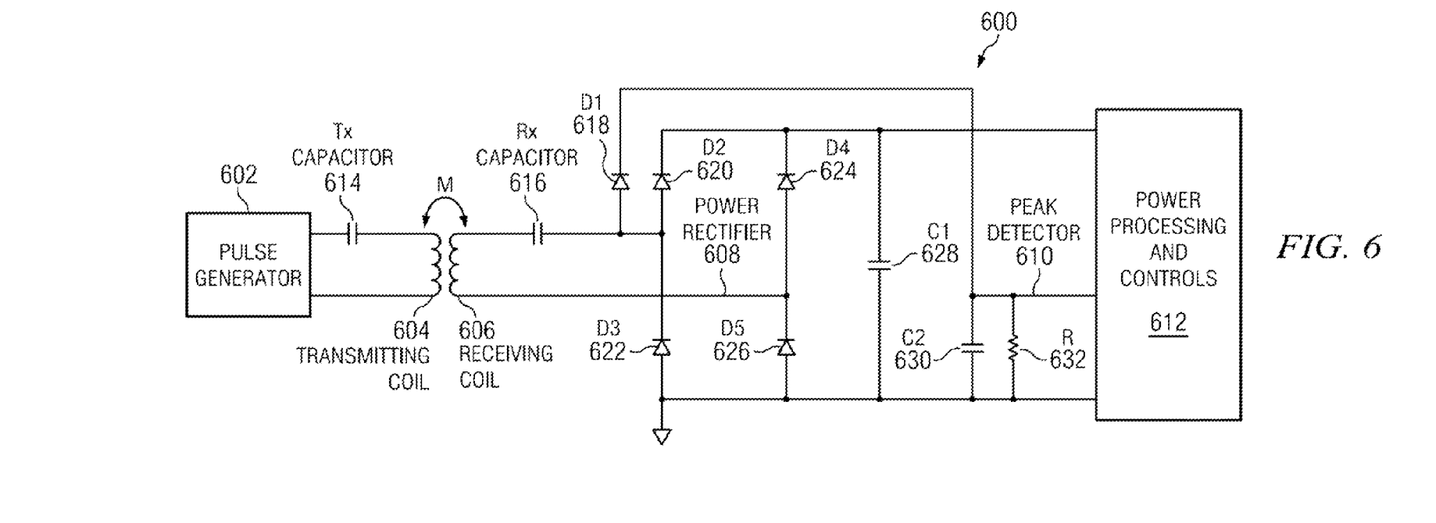
FIG. 6 illustrates a circuit diagram of wireless power transfer system that is able to operate while being connected to various external power sources.

FIG. 6 illustrates an example circuit diagram 600 in accordance with aspects of the present invention.

As illustrated in the figure system 600 includes a signal generator 602, a transmitting coil 604, a receiving coil 606, a power rectifier 608, a peak detector 610, and a power processing and controls portion 612.

Transmitting coil 604 further includes Tx capacitor 614. Tx capacitor 614 is used as protection from voltage spikes from pulse generator 602. Receiving coil 606 further includes Rx capacitor 616. Rx capacitor 616 is used as protection from voltage spikes from transmitting coil 604.

Transmitting coil 604, receiving coil 606, Tx capacitor 614, and Rx capacitor 616 represent transformer 108 of FIG. 1.

Power rectifier 608 further includes a diode 2 (D2) 620, a diode 3 (D3) 622, a diode 4 (D4) 624, a diode 5 (D5) 626 and a capacitor 1 (C1) 628. Power rectifier 608 represents AC/DC portion 110 of FIG. 1.

Peak detector 610 further includes a diode 1 (D1) 618, a capacitor 2 (C2) 630, and a resistor 632. Peak detector 610 represents controller 112 of FIG. 1.

Signal generator 602 is arranged to transmit send power and a pulse to transmitting coil 604. Transmitting coil 604 is arranged to transmit power and a pulse to receiving coil 606. Receiving coil 606 is arranged to send power received from transmitting coil 604 to power rectifier 608. Receiving coil 606 is additionally arranged to send a pulse received from transmitting coil 604 to peak detector 610. Power processing and controls portion 612 is arranged to receive power from power rectifier 608 and to receive a signal from peak detector 610.

In operation, signal generator 602 will receive power from an external power source (not shown) and a pulse from a pulse creator (not shown). Once received, signal generator 602 will send the power and the pulse to transmitting coil 604. After receiving power and a pulse, transmitting coil 604 will send the power and a pulse to receiving coil 606. After the power and pulse are received by receiving coil 606, they are passed on to the rest of the circuit.

Note that the pulse signal that is transmitted is of a much lower frequency than the frequency of the AC power being transmitted.

Once power has been received by receiving coil 606, it passed into power rectifier 608. Power rectifier 608 transforms the power from an AC form to a DC form. Once the power has been transformed to a DC form it is passed to power processing and controls portion 612.

Simultaneously, power that has been received by receiving coil 606 is sent to peak detector 610. Peak detector 610 acts as a low pass filter and has a time constant set such that it allows the pulse to pass through but severely attenuates power. This allows the pulse to be sent to power processing and controls portion 612 while attenuating the AC power.

Attenuating the power allows a clear pulse signal to enter peak detector 610. The length of the pulse will instruct power processing and controls portion 612 whether or not to adjust the rate of power consumption. Once power processing and controls portion 612 receives the pulse, it will adjust the current as described in FIGS. 1-5.

Another example embodiment in accordance with aspects of the present invention will now be described with reference to FIG. 7.

Figure 7:
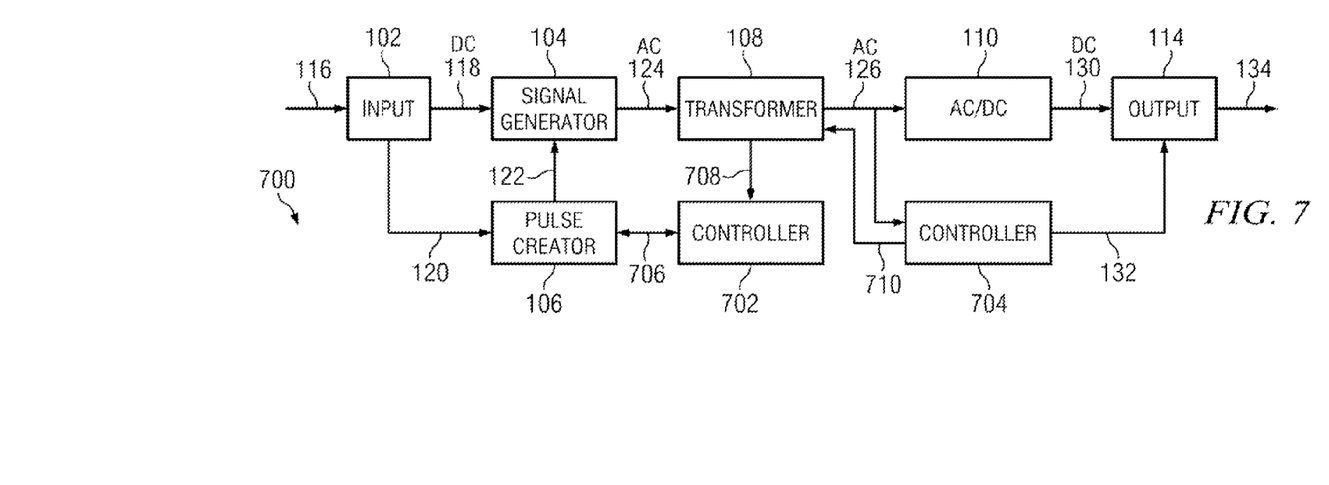
FIG. 7 illustrates another example power transfer system in accordance with aspects of the present invention.

FIG. 7 illustrates another example power transfer system 700 in accordance with aspects of the present invention.

As illustrated in FIG. 7, power transfer system 700 includes input 102, signal generator 104, pulse creator 106, transformer 108, AC/DC converter 110, output 114, a controller 702, and a controller 704. For purposes of brevity, elements (and their respective functions) that are common between power transfer system 100 and power transfer system 700 may not be described again.

Controller 702 is arranged to receive signal 708 from transformer 108. Controller 702 is operable to send output information to pulse creator 106 via signal 706.

Controller 704 is arranged to receive power and transient signal 126 from transformer 108. Controller 704 is operable to send output information, based on power and transient signal 126, to output 114 via signal 132. Controller 704 is additionally operable to send question signal 710 to transformer 108.

Controller 704 contains a look-up table of transient signatures, the external power source that is associated with each signature, and instructions for output 114. Once controller 704 has identified the transient signature, it can locate that particular signature in its look-up table to find the power, voltage, and current of the external power source.

In operation, a first part of power transfer system 700, which includes input 102, signal generator 104, pulse creator 106 and controller 702, is designed to receiver power from a variety of external AC/DC power sources and detect information about power availability. A second part of system 700, which includes AC/DC convertor 110, output 114 and controller 704, is designed to adjust power output according to power availability detected in the first part of system 700 and output it to a wireless charging pad.

The startup of system 700 in this example is the same as the startup of system 100 as described in FIG. 2. The wireless power transfer system starts. Input 102 is connected to an external power source and an initial amount of energy is supplied to power up the second side of the wireless power transfer system.

The system reaches a steady state as signal generator 104 receives power from input 102 and continuously sends it to transformer 108. Simultaneously as power is being sent to signal generator 104, input 102 sends power information signal 120 to pulse creator 106. Pulse creator 106 will check its look-up table for information associated with the external power source. Once the external power source has been identified, pulse creator 106 sends the information associated with the external power source to controller 702.

After the wireless power transfer system reaches a steady state. to assure effective and continuous system operation, controller 704 will send a coded challenge message via signal 710 to transformer 108. Transformer 108 will transfer the coded message from the second side to the first side of the power transfer system. The coded challenge message is received by controller 702 via signal 708.

In one embodiment, the coded challenge message, sent to controller 702 by controller 704, may ask about the amount of power that can be provided by the external power source. Assume in this embodiment, that the external power source is capable of delivering 5 W of power and that output 114 is capable of operating between 0 W and 30 W of power. Once the coded challenge message is received, controller 702 will check information about the external power source that was provided by pulse creator 106, and respond.

Controller 702 may respond to the challenge message with a confirmation by instructing pulse creator 106 to perform an interruption or ignore the message. If a confirmation is sent by controller 702, controller 704 will instruct output 114 to adjust the power being output to the level associated with the challenge message. If no response is received in the predetermined time frame, controller 704 will send another challenge message associated with the power level that is lower in value than the previous one.

In this example, the external power supply is not capable of deliver 30 W of power so controller 702 ignores the message from controller 704. After not receiving a confirmation within the predetermined time frame, controller 704 sends another challenge message asking if the external power supply is capable of supplying 10 W of power. After receiving the message, controller 702 again finds that the external power supply is not capable of supplying the amount of power associated with the new challenge message and ignores it.

After not receiving a response within the predetermined time frame, controller 704 sends a challenge message asking if the external power supply is capable of providing 5 W of power. Controller 702 finds that the external power supply is capable of providing 5 W of power and instructs pulse creator 106 to send a pulse to cause an interruption. The interruption causes transformer 108 to output a transient signature for the duration of the interruption.

Controller 704 receives power and transient signal 126, which contains the transient signature from transformer 108. Controller 704 contains a look-up table of transient signatures, the external power that is associated with each signature, and the instructions for output 114.

Consider an example wireless power transfer system, which includes a 5 W primary side and a 30 W secondary side. In simpler terms, there may be a "dialogue" between the 30 W secondary side and the 5 W primary side of the wireless power transfer system. First, the 30 W secondary side may ask the 5 W primary side, "are you a 30 W provider?" In this case, the 5 W primary side may not respond—indicating "No." Then, the 30 W secondary side may ask the 5 W primary side, "are you a 15 W provider?" In this case, the 5 W primary side may not respond—again indicating "No." Then, the 30 W secondary side may ask the 5 W primary side, "are you a 5 W provider?" In this case, the 5 W primary side may respond with a pulse—"Yes." At this point, the 30 W secondary side may enable the load and limit is consumption to 5 W.

Simultaneously, AC/DC convertor 110 converts AC power that it receives from transformer 108 into DC power. Once the power has been converted into DC, it is sent to output 114.

Once the transient signature is identified as a confirmation to a challenge message, controller 704 can find the instructions associated with the message that can then be sent to output 114. The instructions that are sent to output 114 contain information about how to adjust the power of output 114 as well as how long it will take the second part of the wireless power transfer system to return to a steady state. Once the transient signature is identified as a confirmation by controller 704 it will instruct output 114 to lower the power output to 5 W and begin outputting power after the system reaches a steady state.

In another embodiment, after the system has reached a steady state, controller 704 may send a coded challenge message to controller 702, which asks at what voltage, is the external power supply supplying power. Once the coded challenge message is received, controller 702 will instruct pulse creator 106 to check its look-up to find the voltage and pulse length associated with the external power supply.

Once pulse creator 106 finds the pulse length associated with the voltage of the external power supply, controller 702 will instruct pulse creator 106 to send the pulse to cause an interruption. The interruption causes transformer 108 to output a transient signal for the duration of the interruption.

Consider an example wireless power transfer system, which includes a primary side and a secondary side. In simpler terms, there may be a "dialogue" between the secondary side and the primary side of the wireless power transfer system. First, the secondary side may ask the primary side, "what is your voltage rating?" In this case, the primary side may facilitate an interruption or frequency change, whose duration is associated with the voltage level. Then, the secondary side may measure the pulse duration and determine the voltage level limit loading of the secondary side.

Controller 704 receives power and transient signal 126, which contains the transient signature from transformer 108. Controller 704 contains a look-up table of transient signatures, the external power that is associated with each signature, and the instructions for output 114. Once controller 704 has identified the transient signature, it can locate that particular signature in its look-up table to find the power, voltage, and current of the external power source.

Once the voltage of the external power source has been identified, controller 704 can find the instructions associated with the external power source that can then be sent to output 114. The instructions that are sent to output 114 contain information about how to adjust the voltage of output 114 as well as how long it will take the second part of the wireless power transfer system to return to a steady state.

Figure 8:
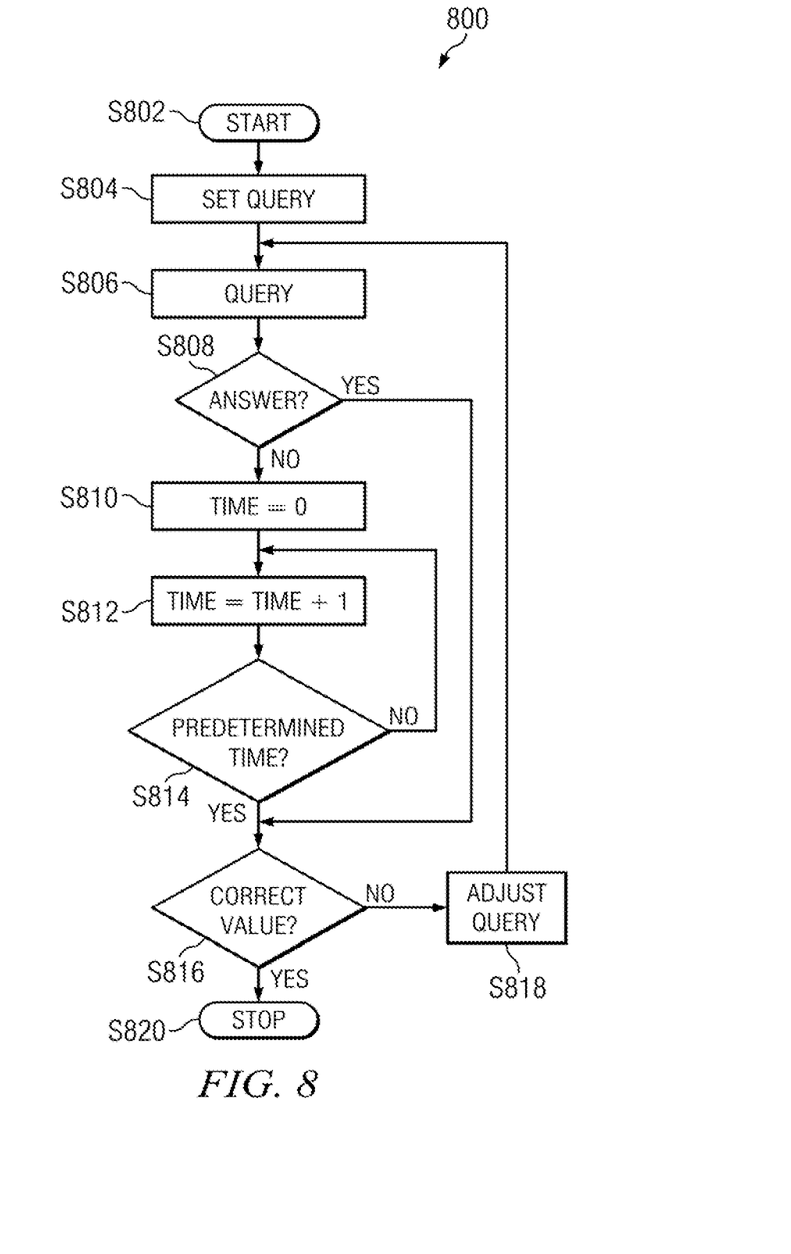
FIG. 8 illustrates a flow chart of a challenge-response sequence between the primary and secondary sides of the wireless power transfer system.

FIG. 8 illustrates a challenge-response sequence 800 of example power transfer system 700 in accordance with aspects of the present invention.

Challenge response sequence 800 starts (S802), and an initial query is established (S804). In this example, the secondary side will query the primary side of the system to see if it is capable of providing the maximum amount of power, which is 30 W.

A query is then made (S806). For example, the secondary side of the wireless power transfer system makes a query to the first side of the wireless power transfer system. The secondary side of the system may ask about the amount of power, voltage, or current that the primary side is able to provide.

It is then determined whether the query was answered (S808). For purposes of discussion, in this example, as the query was just sent by the secondary side, presume that a response has not yet been received (S810).

If a response is not received, a timer is initialized (S810) and is then incremented (S812). For example, as discussed above with reference to FIG. 7, controller 704 may include a timing circuit set for a predetermined waiting period.

Returning to FIG. 8, it is then determined whether the predetermined period for response has expired (S814). For example, if the time counted by the timing circuit of controller 704 is less than the predetermined time (No at S814), then the timing circuit continues to time for a response (S812).

However, if the time counted by the timing circuit of controller 704 is equal to or greater than the predetermined time (Yes at S814), then it is determined whether the queried value is correct (S816). For example, if the primary side is not capable of providing 30 W of power to the secondary side, the primary side may not send a response, thereby indicating a "No." In other examples, if the primary side is not capable of providing 30 W of power to the secondary side of the system, the primary it will respond "No." A "No" may be transmitted with an interrupted signal as discussed above, for example, with reference to FIG. 3.

If it is determined that the value is not correct, the query is adjusted (S818). For example, the secondary side may query the primary side of the system to see if it is capable of providing a lesser amount of power, which may be 15 W.

At this point a new query is sent (S806).

The process repeats and it is again determined whether the current queried value is correct (S816). For example, if the primary side is not capable of providing 15 W of power to the secondary side, the primary side may not send a response, thereby indicating a "No." In other examples, if the primary side is not capable of providing 15 W of power to the secondary side of the system, the primary it will respond "No." A "No" may be transmitted with an interrupted signal as discussed above, for example, with reference to FIG. 3.

If it is determined that the value is not correct, the query is adjusted (S818). For example, the secondary side may query the primary side of the system to see if it is capable of providing a lesser amount of power, which may be 5 W.

At this point a new query is sent (S806).

The process repeats and it is again determined whether the current queried value is correct (S816). For purposes of discussion, in this example, the primary side is capable of providing 5 W of power to the secondary side. As such, in this example the primary will respond "Yes." A "Yes" may be transmitted with an interrupted signal having a different pulse length that that associated with a "No" response.

At this time the primary side of the wireless power transfer system answers "Yes" by sending a pulse to the secondary side of the system as illustrated in FIG. 7. Once the secondary side of the system receives "Yes" from the primary side of the system, it adjusts its output to the level associated with the level that was queried. In this example, the primary side answered "Yes" when queried if it was able to provide 5 W of power, so the secondary side of the system adjusts its output to 5 W of power (S810).

If the secondary side makes a predetermined amount of queries without receiving "Yes" from the primary side, the secondary side may adjust its settings to the lowest possible value (S818). For example, if the predetermined amount of queries from the secondary side was set to four, after receiving "No" from the primary side of the system four times, the secondary side of the system may adjust its output to the lowest possible value (S818).

The present invention provides a method for adjusting power output settings depending on the external power source that it is connected to. The power availability information is communicated by sending a pulse of a certain length from the first side to the second side of the wireless power transfer system.

The pulse length is dependent on power availability, in the examples described above; 50 µs was added to a pulse for every 25% of the nominal amount of power that was not available.

By sending a pulse of a length that is proportional to the amount of power available, the first half of the wireless power transfer system can communicate power availability to the second half. The second half of the wireless power transfer system determines power available from the external power source; it is able to adjust the output which prevents perpetual system reboots and safety trips.

The duration of a pulse, and the associated interruption it causes, may be proportional to the amount of power that is available. In some embodiments, the duration of a pulse, and the associated interruption it causes, may be inversely proportional to the amount of power that is available. Additionally, in some embodiments a pulse may be associated with a low power source and no pause is associated with full power available. In other embodiments a pulse may be associated with a high power source and no pulse is associated with lower power available.

In the above example embodiments, a pulse associated with a given external power source is output to interrupt transformer 108. In another non-limiting example embodiment, pulse 122 may not be used for an interruption of power 118, but may be used to attenuate power 118 for a period of time. In this case the look-up table of controller 112 may contain a list of voltages for power and transient signal 126. Each different voltage level would be associated with a different external power supply and would additionally be associated with different voltage and current adjustments for output 114.

Aspects for the present invention employ a system or method to distinguish between power capabilities of input sources and to communicate the identified power capability to the secondary side of a wireless power transfer system. The secondary side of the wireless power transfer system, upon receiving power capability, adjusts the current available for the payload in accordance with received information on power source capabilities.

In some example embodiments, the transmitter sends a digital ping voltage that energizes the receiver for the first time during wireless power transfer session. The digital ping is usually constitutes a continuous oscillation of $T_x$ on the specified frequency. The duration of the ping is specified to provide some initial power on the secondary side to awake the secondary side control circuitry. To communicate type of available power source, the pause is incorporated in the digital ping.

The agreement between a secondary side and a primary side is predetermined as to the relationship of the duration of the interruption and the power capability of the primary side. The lowest power level may not require any actions (interruptions) on the primary side. This allows for backwards compatibility with low power wireless power transfer compliant transmitters.

In yet another non-limiting example embodiment, a wireless power transfer system includes an energy receiver and an energy transmitter. The transmitter may vary in its power capabilities, while the receiver has a potential of operating on variable power levels that exceed the power capabilities of the transmitter. For example, at different instances the receiver is capable of operating with power levels that range from 0 W to 30 W and the transmitter may only be able to provide 5 W, 10 W, 15 W, or 30 W of power.

To assure effective and continuous system operation, the receiver will send a coded challenge message associated with the expected power delivery rate to the transmitter during system initiation. In response to this message the transmitter either sends a confirmation by performing an interruption or ignores the message. If a confirmation is sent by the transmitting side, the receiving side of the system will lower its energy output to the level associated with the challenge message. If no response is received, the receiver will send another challenge message with a lower power level than the previous message.

The challenge-response sequence will continue until either a response is received or the lowest power level is reached that is not needed to be acknowledged and is assumed as being as such by default.

In yet another non-limiting example embodiment, more than one pulse may be sent in pulse 122 to interrupt or attenuate power 118. Each different interruption or attenuation of power 118 may communicate a different aspect of the power source to the secondary side of the wireless power transfer system. For example, a first pulse or attenuation may communicate the power output of the external power source. A second pulse (such as pulse 321) or attenuation may communicate the voltage at which power is being delivered by the external power source. A third pulse or attenuation may be used to communicate the current at which power is being delivered by the external power source.

In yet another non-limiting example, pulse 122 may undergo pulse position modulation. In this case, pulses are sent out at varying times to create a unique pattern. Each pattern that controller 112 receives may be associated with an aspect of the external power supply. Each pattern received would be associated with a set of instructions to for output 114.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A DC/DC converter for use with DC input signal, said DC/DC converter comprising:
    an input portion operable to receive the DC input signal;
    an input determining portion operable to determine a parameter of the DC input signal;
    an information signal generator operable to generate a first information signal based on the parameter;
    a primary signal generator operable to generate a primary signal based on the DC input signal and an information signal;
    a transformer having a primary side and a secondary side, said primary side operable to induce a secondary signal in said secondary side based on the primary signal;
    a controlling portion operable to generate a control signal based on the secondary signal;
    a AC/DC converting portion operable to output a DC signal based on the secondary signal;
    an output portion operable to output an output signal based on the DC signal;
    a second controlling portion operable to generate a query,
    wherein said transformer is further operable to send the query to said information signal generator, and
    wherein said information signal generator is operable to generate the first information signal based on the parameter upon receipt of the query.

2. The DC/DC converter of claim 1,
    wherein said information signal generator is operable to generate a pulse having a first predetermined pulse length as the first information signal,
    wherein said primary signal generator is operable to generate the primary signal as a first signal portion, a second signal portion and a third signal portion,
    wherein the first signal portion has a first amplitude,
    wherein the second signal portion has a second amplitude and has a duration based on the first predetermined pulse length,
    wherein the third signal portion has the first amplitude, and
    wherein the first amplitude is not equal to the second amplitude.

3. The DC/DC converter of claim 2,
    wherein said input portion is operable to receive the DC input signal as one of a first DC input signal and a second DC input signal, the first DC input signal having a first DC input signal amplitude, the second DC input signal having a second DC input signal amplitude,
    wherein said input determining portion is operable to determine the amplitude of the DC input signal to be the first DC input signal amplitude when the DC input signal is the first DC input signal,
    wherein said input determining portion is operable to determine the amplitude of the DC input signal to be the second DC input signal amplitude when the DC input signal is the second DC input signal,
    wherein said information signal generator is operable to generate the pulse having a first predetermined pulse length when the DC input signal is the first DC input signal,
    wherein said information signal generator further operable to generate the pulse having a second predetermined pulse length when the DC input signal is the second DC input signal,
    wherein said DC/DC converting portion is operable to output the DC signal as a first DC signal portion followed by a second DC signal portion,
    wherein the first DC signal portion has a first DC amplitude,
    wherein the second DC signal portion has a second DC amplitude,
    wherein the first DC amplitude is not equal to the second DC amplitude, and
    wherein a start of the second DC signal portion is based on the pulse.

4. The DC/DC converter of claim 3, further comprising:
    wherein the second DC signal portion has a second DC amplitude having a value $V_1$ when the DC input signal is the first AC input signal,
    wherein the second DC signal portion has a second DC amplitude having a value $V_2$ when the DC input signal is the second DC input signal,
    wherein $V_1 \neq V_2$, and
    wherein said controller is operable instruct said output portion to output the output signal as a first output signal when the second DC signal portion has a second DC amplitude having a value $V_1$, and
    wherein said controller is operable instruct said output portion to output the output signal as a second output signal when the second DC signal portion has a second DC amplitude having a value $V_2$.

5. The DC/DC converter of claim 1 for use in a wireless power transfer system in which the information signal is based upon the power available at the primary side of the system.

6. The DC/DC converter of claim 2,
wherein said information signal generator further operable to generate the first information signal to include a second pulse having a second predetermined pulse length,
wherein said primary signal generator is further operable to generate the primary signal to additionally include fourth signal portion and a fifth signal portion,
wherein the fourth signal portion has the second amplitude,
wherein the fifth signal portion has the first amplitude, and
wherein the second pulse is separated from the first pulse.

7. The DC/DC converter of claim 6, further comprising:
a second controlling portion operable to generate a query,
wherein said transformer is further operable to send the query to said information signal generator, and
wherein said information signal generator is operable to generate the first information signal based on the parameter upon receipt of the query.

8. A method of converting a DC input signal to a DC signal, said method comprising:
receiving, via an input portion, the DC input signal;
determining, via an input determining portion, a parameter of the DC input signal;
generating, via an information signal generator, a first information signal based on the parameter;
generating, via a primary signal generator, a primary signal based on the DC input signal and the information signal;
inducing, in a secondary side of a transformer having a primary side and the secondary side, a secondary signal based on the primary signal;
generating, via a controlling portion, a control signal based on the secondary signal;
outputting, via a AC/DC converting portion, a DC signal based on the secondary signal; and
outputting, via an output portion, an output signal based on the DC signal;
generating, via a second controlling portion, a query; and
sending, via the transformer, the query to said information signal generator,
wherein said generating, via a controlling portion, a control signal based on the secondary signal comprises generating the control signal upon receipt of the query.

9. The method of claim 8,
wherein said generating, via an information signal generator, a first information signal based on the parameter comprises generating a pulse having a first predetermined pulse length as the first information signal,
wherein said generating, via a primary signal generator, a primary signal based on the DC input signal and the information signal comprises generating the primary signal as a first signal portion, a second signal portion and a third signal portion,
wherein the first signal portion has a first amplitude,
wherein the second signal portion has a second amplitude and has a duration based on the first predetermined pulse length,
wherein the third signal portion has the first amplitude, and
wherein the first amplitude is not equal to the second amplitude.

10. The method of claim 9,
wherein said receiving, via an input portion, the DC input signal comprises receiving the DC input signal as one of a first DC input signal and a second DC input signal, the first DC input signal having a first DC input signal amplitude, the second DC input signal having a second DC input signal amplitude,
wherein said determining, via an input determining portion, a parameter of the DC input signal comprises determining the amplitude of the DC input signal to be the first DC input signal amplitude when the DC input signal is the first DC input signal,
wherein said determining, via an input determining portion, a parameter of the DC input signal comprises determining the amplitude of the DC input signal to be the second DC input signal amplitude when the DC input signal is the second DC input signal,
wherein said generating, via an information signal generator, a first information signal based on the parameter comprises generating the pulse having a first predetermined pulse length when the DC input signal is the first DC input signal,
wherein said generating, via an information signal generator, a first information signal based on the parameter comprises generating the pulse having a second predetermined pulse length when the DC input signal is the second DC input signal,
wherein said outputting, via a AC/DC converting portion, a DC signal based on the secondary signal comprises outputting the DC signal as a first DC signal portion followed by a second DC signal portion,
wherein the first DC signal portion has a first DC amplitude,
wherein the second DC signal portion has a second DC amplitude,
wherein the first DC amplitude is not equal to the second DC amplitude, and
wherein a start of the second DC signal portion is based on the pulse.

11. The method of claim 10, further comprising:
wherein the second DC signal portion has a second DC amplitude having a value $V_1$ when the DC input signal is the first DC input signal,
wherein the second DC signal portion has a second DC amplitude having a value $V_2$ when the DC input signal is the second DC input signal,
wherein $V_1 \neq V_2$, and
wherein the controller is operable instruct the output portion to output the output signal as a first output signal when the second DC signal portion has a second DC amplitude having a value $V_1$, and
wherein the controller is operable instruct the output portion to output the output signal as a second output signal when the second DC signal portion has a second DC amplitude having a value $V_2$.

12. The method of claim 11, further comprising:
generating, via a second controlling portion, a query; and
sending, via the transformer, the query to said information signal generator,
wherein said generating, via a controlling portion, a control signal based on the secondary signal comprises generating the control signal upon receipt of the query.

13. The method of claim 8 for use in a wireless power transfer system in which the information signal is based upon the power available at the primary side of the system.

14. The method of claim 8,
wherein the information signal generator is further operable to generate the first information signal to include a second pulse having a second predetermined pulse length,
wherein the primary signal generator is further operable to generate the primary signal to additionally include fourth signal portion and a fifth signal portion,
wherein the fourth signal portion has the second amplitude,
wherein the fifth signal portion has the first amplitude, and
wherein the second pulse is separated from the first pulse.

15. The method of claim 14, further comprising:
generating, via a second controlling portion, a query; and
sending, via the transformer, the query to said information signal generator,
wherein said generating, via a controlling portion, a control signal based on the secondary signal comprises generating the control signal upon receipt of the query.

16. A DC/DC converter for use with DC input signal, said DC/DC converter comprising:
an input portion operable to receive the DC input signal;
an input determining portion operable to determine a parameter of the DC input signal;
an information signal generator operable to generate a first information signal based on the parameter;
a primary signal generator operable to generate a primary signal based on the DC input signal and the information signal;
a transformer having a primary side and a secondary side, said primary side operable to induce a secondary signal in said secondary side based on the primary signal;
a controlling portion operable to generate a control signal based on the secondary signal;
a AC/DC converting portion operable to output a DC signal based on the secondary signal;
a second controlling portion operable to generate a query; and
an output portion operable to output an output signal based on the DC signal,
wherein said information signal generator is operable to generate a pulse having a first predetermined pulse length as the first information signal,
wherein said primary signal generator is operable to generate the primary signal as a first signal portion, a second signal portion and a third signal portion,
wherein the first signal portion has a first amplitude,
wherein the second signal portion has a second amplitude and has a duration based on the first predetermined pulse length,
wherein the third signal portion has the first amplitude,
wherein the first amplitude is not equal to the second amplitude,
wherein said input portion is operable to receive the DC input signal as one of a first DC input signal and a second DC input signal, the first DC input signal having a first DC input signal amplitude, the second DC input signal having a second DC input signal amplitude,
wherein said input determining portion is operable to determine the amplitude of the DC input signal to be the first DC input signal amplitude when the DC input signal is the first DC input signal,
wherein said input determining portion is operable to determine the amplitude of the DC input signal to be the second DC input signal amplitude when the DC input signal is the second DC input signal,
wherein said information signal generator is operable to generate the pulse having a first predetermined pulse length when the DC input signal is the first DC input signal,
wherein said information signal generator further operable to generate the pulse having a second predetermined pulse length when the DC input signal is the second DC input signal,
wherein said DC/DC converting portion is operable to output the DC signal as a first DC signal portion followed by a second DC signal portion,
wherein the first DC signal portion has a first DC amplitude,
wherein the second DC signal portion has a second DC amplitude,
wherein the first DC amplitude is not equal to the second DC amplitude,
wherein a start of the second DC signal portion is based on the pulse,
wherein the second DC signal portion has a second DC amplitude having a value $V_1$ when the DC input signal is a first AC input signal,
wherein the second DC signal portion has a second DC amplitude having a value $V_2$ when the DC input signal is the second DC input signal,
wherein $V_1 \neq V_2$, and
wherein said controller is operable instruct said output portion to output the output signal as a first output signal when the second DC signal portion has a second DC amplitude having a value $V_1$,
wherein said controller is operable instruct said output portion to output the output signal as a second output signal when the second DC signal portion has a second DC amplitude having a value $V_2$,
wherein said transformer is further operable to send the query to said information signal generator,
wherein said information signal generator is operable to generate the first information signal based on the parameter upon receipt of the query, and
wherein said query corresponds inquires as to whether the DC input signal is 30 W.

* * * * *